S. MIGLIAVACCA.
CHAIN GRIP FASTENER.
APPLICATION FILED APR. 8, 1912.

1,039,778.

Patented Oct. 1, 1912.

Witnesses:

Inventor:

UNITED STATES PATENT OFFICE.

SERO MIGLIAVACCA, OF BREMERTON, WASHINGTON.

CHAIN-GRIP FASTENER.

1,039,778.  Specification of Letters Patent.  Patented Oct. 1, 1912.

Application filed April 8, 1912. Serial No. 689,339.

*To all whom it may concern:*

Be it known that I, SERO MIGLIAVACCA, a citizen of the United States, residing at Bremerton, in the county of Kitsap and State of Washington, have invented new and useful Improvements in Chain-Grip Fasteners, of which the following is a specification.

The object of my invention is to provide a secure, safe and convenient method of fastening grip chains around the tires of automobiles and similar rubber tired machines, and on all other machines requiring chains securely fastened, and I attain this object by the mechanism illustrated in the accompanying drawing, in which—

Figure 1:
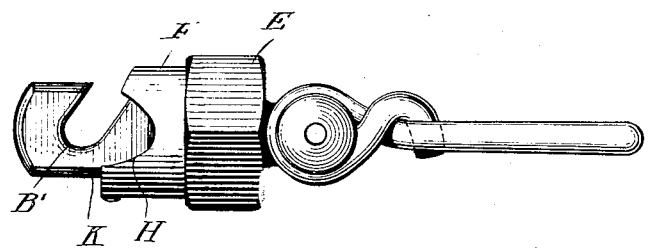
Figure 2:
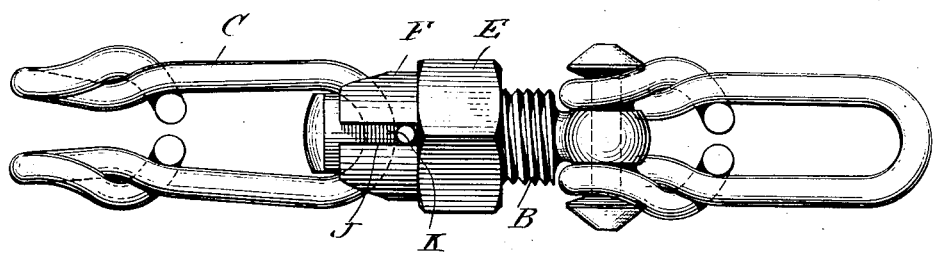
Figure 3:
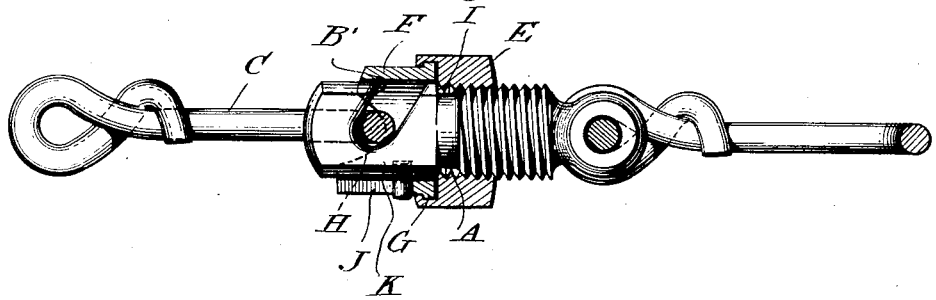

Figure 1 is a side view of my invention showing the hook open; Fig. 2 is an upper surface view of my invention showing the chain link inserted in the hook and the hook closed; and Fig. 3 is a sectional side view of my invention, showing the link inserted in the hook and the hook closed.

Similar letters refer to similar parts throughout the several views.

In the construction of my improved chain grip fastener a piece of round rod, A, Fig. 1, is used. This rod is provided with screw threads, B, over which an ordinary threaded nut, E, is screwed. The rod is flattened on both sides of one end thereof, to which end a link of the grip chain is fastened by means of a bolt passing through a hole in the rod, with the link of the chain wound around each end of the bolt, as shown particularly in Fig. 2. By the flattening of the rod a better fastening can be made, at the same time allowing the link and bolt to move with a hinge-like motion, thus permitting the grip chain to fit more closely to the tire or other machine on which it may be used. At the opposite end of the rod, at B', Fig. 1, the same is formed into a hook into which a link at the other end of the grip chain, C, may be inserted. A common hexagonal nut, E, provided with screw threads is adapted to screw on the rod. To the nut a sleeve or hollow nipple, F, is swivelly connected and secured, G, Fig. 3, so that the nut will turn freely over the sleeve, this sleeve or hollow nipple being sufficiently large to enable it to move freely over the rod. The nipple is made U-shaped, or provided with notches, H, adapted to fit down over the hook and thereby prevent the link of the chain from working out of the hook. By turning the nut on the screw threads of the bar or rod the nipple is moved off of the hook, Fig. 1, allowing the chain link, C, to be inserted therein. The nut is then turned back on the screw threads of the rod until the nipple covers the hook and the end of the chain link inserted therein, the link passing into the notches, H, which prevent it from being disengaged or coming out of the hook, Figs. 2 and 3. The hook is larger than the rod, and is so constructed as to leave a square shoulder, I, Fig. 3, against which the nut rests when screwed down to close the hook. The sleeve or nipple is provided with a slot, J, Fig. 2, which works over a pin secured to the upper surface of the hook, K, Fig. 2, the purpose of the slot and pin being to guide the sleeve so that the sleeve notches will fit over the chain link when the hook is closed. The portion of the sleeve containing the slot is sufficiently long to enable the hook to be opened and the link inserted and released without disengaging the pin from the slot. When the hook is closed the nut rests against the shoulder, I, Fig. 3, and the notches, H, in the sleeve are sufficiently deep to enable the link to move freely in the hook.

I claim:

A connecting device for chains consisting of a screw threaded bar or rod provided with a hook and a bolt at its respectively opposite ends for the reception of the end links of chains, a nut adapted to fit the threaded bar and a sleeve or hollow nipple swivelly connected with the nut, said sleeve having notches at its free end and constructed to loosely fit the bar and to move with the nut to open and close the hook end of the bar; a shoulder on the hook end of the bar adapted for the nut to rest against, a pin in the hook adapted to work in a slot in the free end of the sleeve.

S. MIGLIAVACCA.

Witnesses:
ALBERT D. MARTIN,
W. A. KEENE.